United States Patent [19]
Macovski

[11] Patent Number: 5,068,728
[45] Date of Patent: Nov. 26, 1991

[54] COMPATIBLE INCREASED ASPECT RATIO TELEVISION SYSTEM

[76] Inventor: Albert Macovski, 2505 Alpine Rd., Menlo Park, Calif. 94025

[21] Appl. No.: 542,108

[22] Filed: Jun. 22, 1990

[51] Int. Cl.$^5$ ............................................. H04N 7/04
[52] U.S. Cl. ..................................... 358/141; 358/12; 358/142; 358/11
[58] Field of Search ................... 358/140, 12, 11, 141, 358/142, 180, 147

[56] References Cited

U.S. PATENT DOCUMENTS

| | | | |
|---|---|---|---|
| 4,551,754 | 11/1985 | Meise et al. | 358/180 |
| 4,959,717 | 9/1990 | Faroudja | 358/12 |
| 4,979,020 | 12/1990 | Isnardi | 358/141 X |
| 4,979,041 | 12/1990 | Schreiber | 358/141 |
| 4,984,078 | 1/1991 | Skinner | 358/141 |

FOREIGN PATENT DOCUMENTS 258581 10/1989 Japan .

OTHER PUBLICATIONS

"6-MHz Single-Channel HDTV Systems", Schreiber; Symposium on HDTV Held in Ottawa, Oct. '87; pp. 1-7.

Primary Examiner—Victor R. Kostak

[57] ABSTRACT

The aspect ratio of a television system is increased by reducing the number of active lines in the vertical direction and using those lines to insert information for increasing the width of horizontal lines. The added information is superimposed at or near black level so that conventional receivers will merely see a shorter image without the increased width. To minimize the visibility of the added information, the high-energy low frequencies can be reduced. Alternatively the low frequency information for lengthening the horizontal lines can be placed in compressed form on either side of the normal horizontal lines without being seen on conventional receivers or used to modulate a high-frequency burst placed in the inactive lines. The increased aspect ratio receiver decodes the information in the inactive vertical lines, adds it to the decoded low frequency information, and displays it as an increased aspect ratio image in HDTV receivers. The decrease in vertical height and increase in horizontal width can provide approximately a 5/3 aspect ratio with significantly altering the height of the image on conventional receivers.

11 Claims, 4 Drawing Sheets

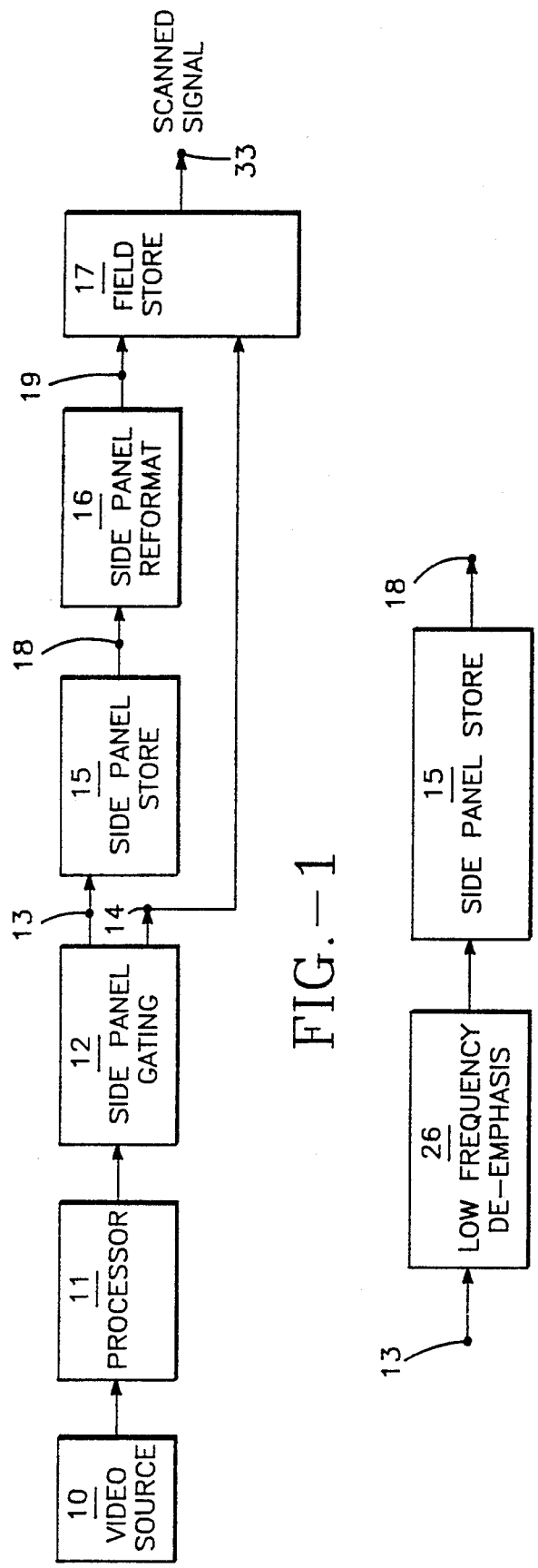
FIG.–1
FIG.–1A
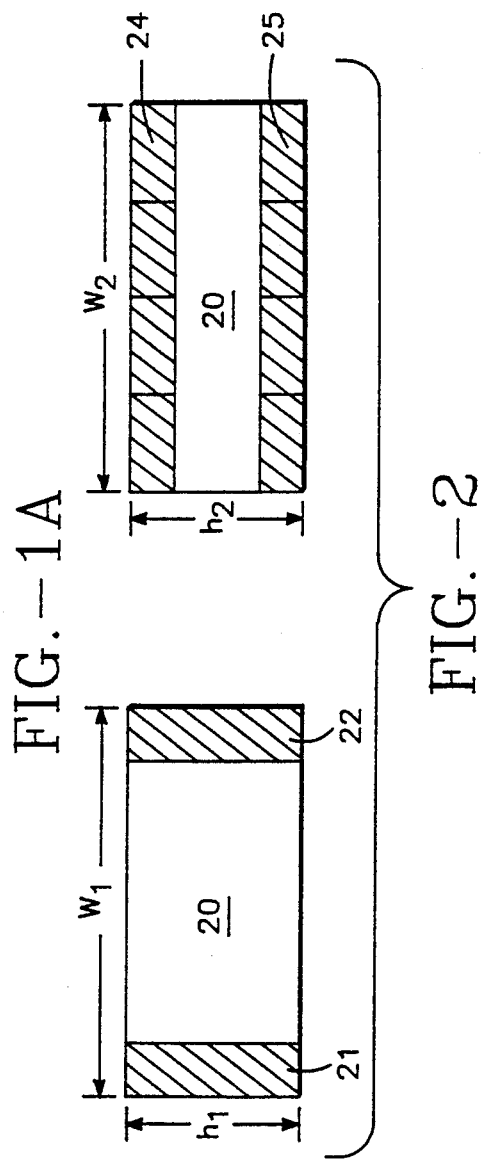
FIG.–2

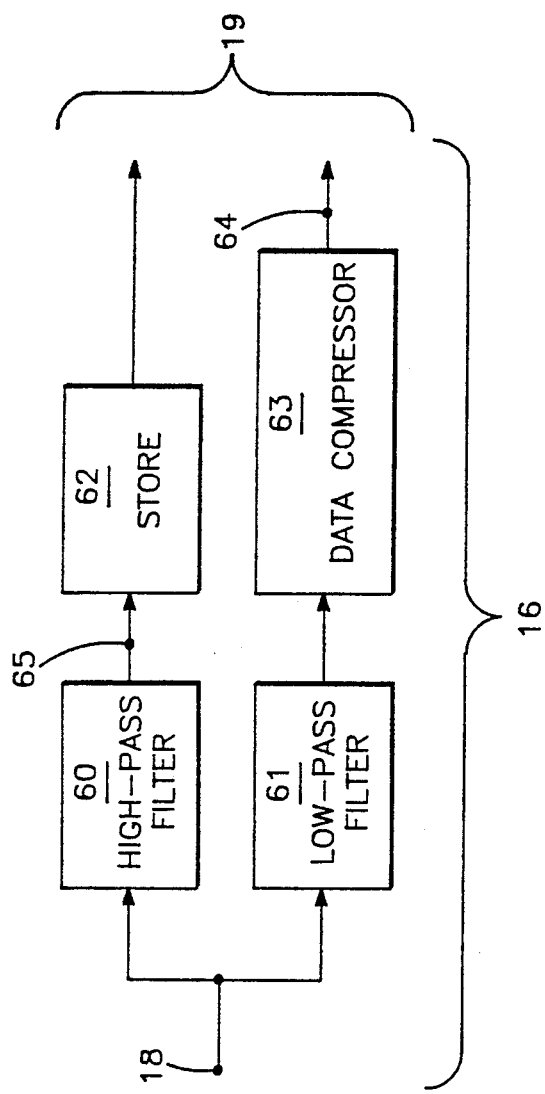
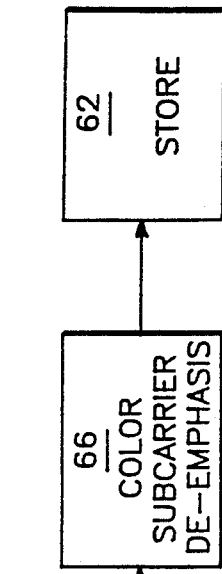
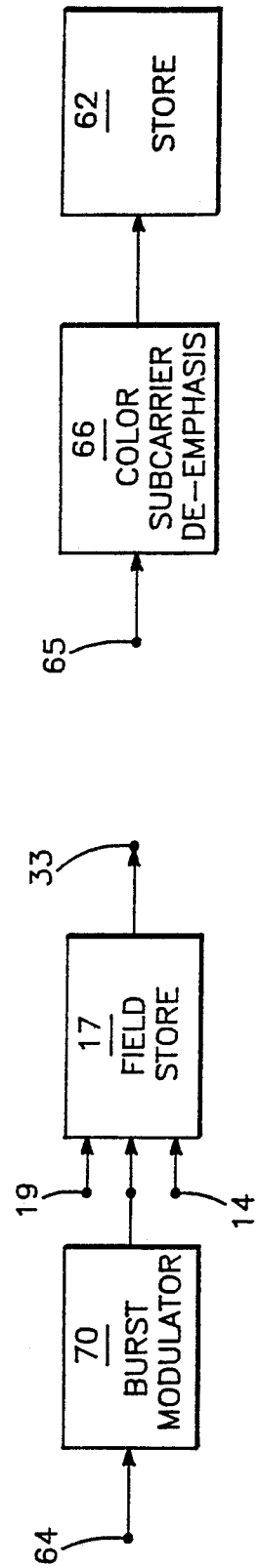

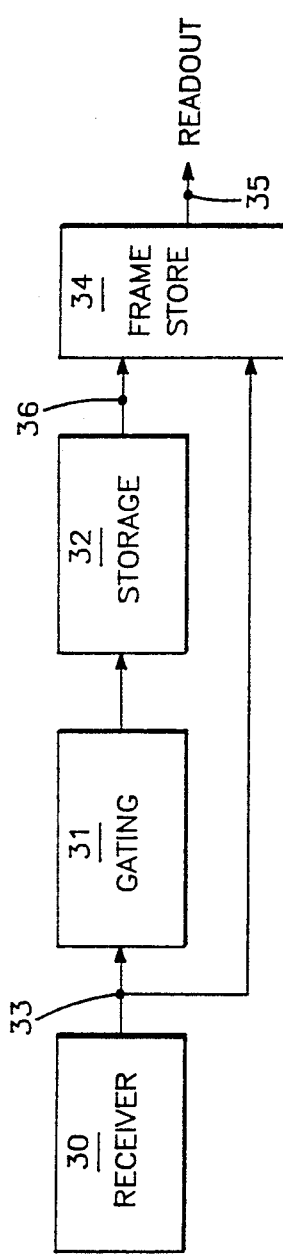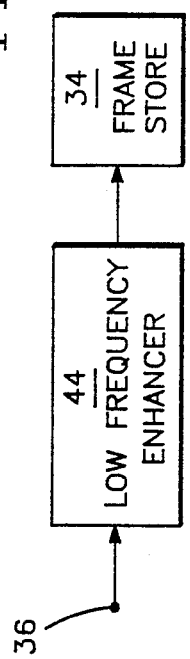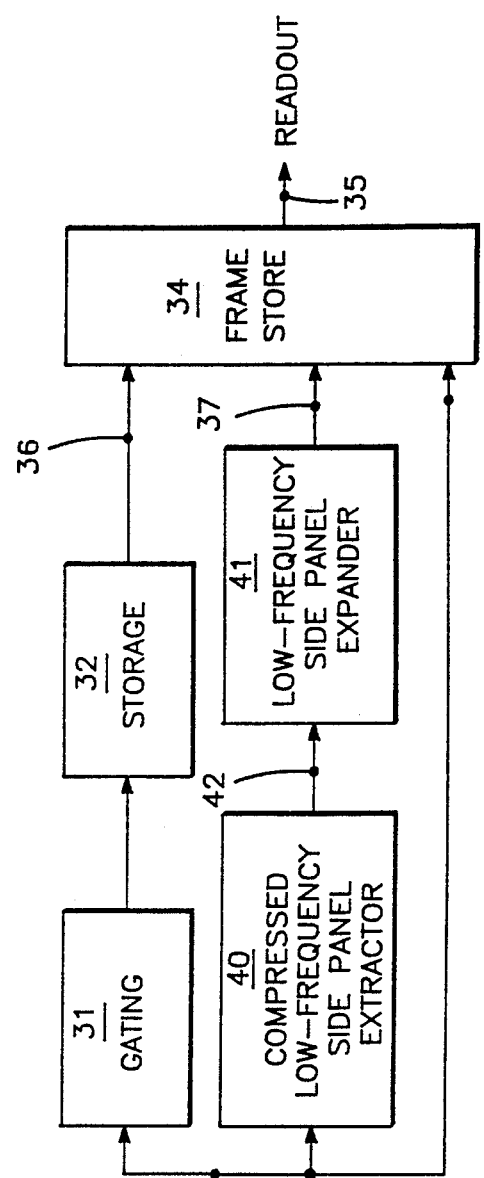

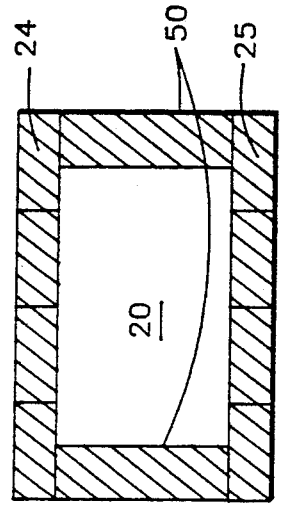
FIG.—8A
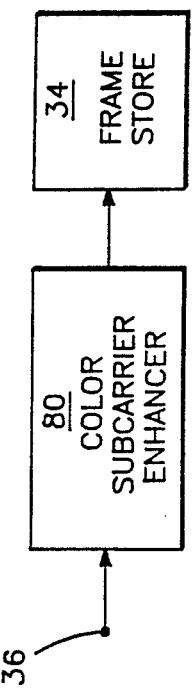
FIG.—9A
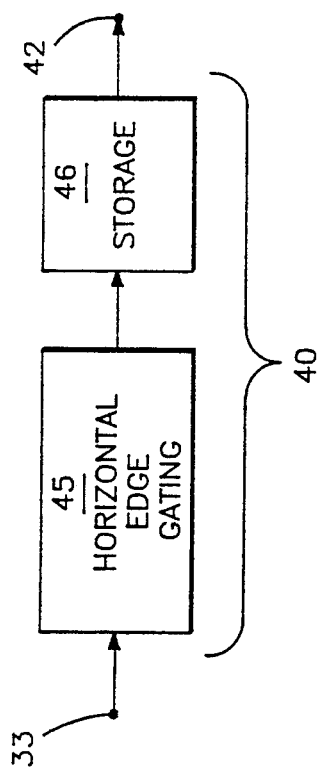
FIG.—8
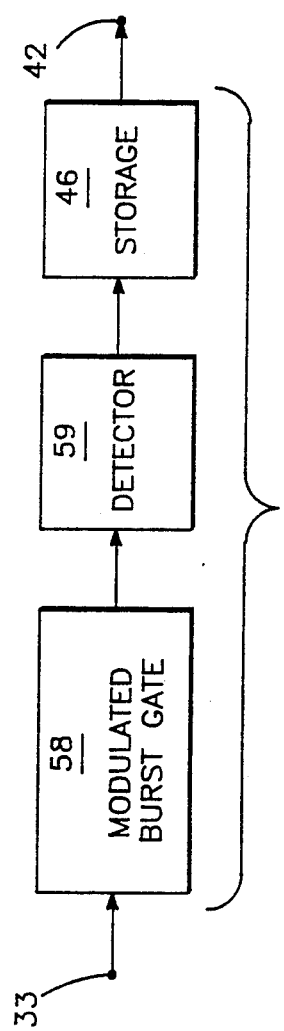
FIG.—9
FIG.—10

COMPATIBLE INCREASED ASPECT RATIO TELEVISION SYSTEM

BACKGROUND OF THE INVENTION

1. Field of the Invention

This invention relates to television systems. In a primary application the invention relates to increasing the aspect ratio of compatible high-definition television systems.

2. Description of the Prior Art

With the advent of improved display and camera tubes, efforts have been made to provide high definition television (HDTV) systems for home consumption. It is clearly desirable to have this improved system compatible with existing television receivers and channel allocations. A major problem in this compatibility requirement is that existing systems and receivers are based on a 4/3 aspect ratio, while the newer high definition systems have higher aspect ratios of approximately 5/3. A number of approaches have been suggested to deal with this problem. These are described in the December 1987 issue of the *IEEE Transactions on Broadcasting Vol. BC*-33, No. 4. In an article by M.A. Isnardi et al. of the David Sarnoff Research Center on pages 116–123 of that issue a compatible system is described. It provides the additional information to add added material on either side of the existing image to increase the aspect ratio. This is done by first time-compressing the low frequency information in these "side panels" so that it occupies a negligible width, and can thus be added to the existing image without being disturbing. The 1.0 μsec. on each end of a horizontal line are normally hidden by the overscan of most receivers. The high frequency information of these "side panels" is time expanded to fill the entire line, thus reducing its bandwidth. This additional information is sent on an additional subcarrier at 3.1 MHz. This subcarrier is rendered invisible on conventional receivers by having it interlaced (odd multiple of one-half the line frequency) and phase-reversed on alternate fields so as to average to zero in the color channel. This approach, although effective, uses up a significant portion of the available spectra for adding information. Therefore, the system described only modestly increases the resolution over existing systems.

In the same issue of the *IEEE Transactions* another method is described for increasing the aspect ratio in an article by W. E. Glenn and K. G. Glenn on pages 107–115 entitled *"High Definition Television Compatible Transmission System"*. Here the authors make the astute observation that the desired aspect ratio increase can be realized by making the horizontal extent 10% greater, and the vertical extent 10% less. However, in making use of this observation, the authors suggest running video from the end of the burst interval, to the beginning of the next sync pulse, adding about 4 μsec. To reduce the vertical size, 43 of the active vertical lines are inactivated. Firstly, it is indeed highly questionable whether receivers will operate properly with this greatly reduced blanking interval. Many will exhibit foldover, sync and color problems. Also, it is inefficient to have 43 lines without any information on them when trying to get the greatest resolution in a limited bandwidth.

SUMMARY OF THE INVENTION

An object of this invention is to provide a system of increased aspect ratio which is compatible with existing television receivers.

A further object of this invention is to increase the aspect ratio without using subcarrier bandwidth which can be used for improved resolution.

Briefly, in accordance with the invention, approximately 10% of the vertical lines are removed from the top and bottom of the normal image and used to provide information for the side panels for increased image width. The information added can be high-frequency, so that the missing top and bottom appear black. The low frequency portion of the side panels can either be added in compressed form at the beginning and end of each line, or can be added to the vertical lines as modulation of a subcarrier burst.

BRIEF DESCRIPTION OF THE DRAWINGS

For a more complete disclosure of the invention reference may be made to the following detailed description of several illustrated embodiments thereof which are given in conjunction with the accompanying drawings, of which:

FIG. 1 is a block diagram of the invention for forming an increased aspect ratio image which is compatible with existing receivers;

FIG. 1a is a block diagram of an alternative embodiment where the low frequencies are reduced;

FIG. 2 illustrates the portions of the television raster used for the added information;

FIG. 3 is a block diagram of an embodiment of the invention where the low and high frequencies of the added information are separated and separately scanned;

FIG. 4 illustrates an embodiment of FIG. 3 where the compressed low frequencies modulate a radio frequency burst.

FIG. 5 illustrates a modification to help compatibility with existing receivers;

FIG. 6 is a block diagram of an increased aspect ratio receiver using the invention;

FIG. 6a is a block diagram of an alternative embodiment where the low frequencies are enhanced to compensate for the transmitter;

FIG. 7 is a block diagram of a receiver for the embodiment where the high and low frequencies are separated;

FIG. 8 is a block diagram of a portion of a receiver for an embodiment of the invention where the compressed low frequencies are on the image edges;

FIG. 8a is an illustration of the distribution of of information on the raster when the compressed low frequencies are on the image edges;

FIG. 9 is a block diagram of a portion of a receiver for an embodiment of the invention where the compressed low frequencies modulate a burst;

FIG. 9a is a diagram of a representative waveform used during the inactive line period when the compressed low frequencies modulate a burst; and FIG. 10 is a block diagram of a system for enhancing the high frequencies in the vicinity if the color subcarrier when they are reduced at the transmitter to help keep the inactive lines dark.

DESCRIPTION OF THE PREFERRED EMBODIMENT

In order to increase the aspect ratio of new HDTV (high definition television) and have the signal remain compatible with existing receivers, information must be added which represents the increased width of the side panels. In the previously referred to, paper by Isnardi, this was accomplished using an additional modulated carrier. This system, although effective, uses up spectrum that might otherwise be used for increased resolution. In this invention, the added information is placed in the scan lines which are rendered inactive in order to reduce the height. Thus the aspect ratio is increased from approximately 4/3 to approximately 5/3 by reducing the height by about 10%, making the appropriate number of scan lines inactive, and increasing the width about 10% by adding side panel information within the inactive lines.

The basic system is shown in FIG. 1. A video source 10 provides the video signal. This can be a television camera. For high-definition systems, this can be a very high resolution camera. The processor 11 stores and rescans the video signal, if necessary, to provide a 5/3 aspect ratio image, having the NTSC standard number of scan lines. This signal is applied to gating circuit 12 which gates out the side panels providing two signals; the side panel information 13 and the central information, 14.

This is represented by the image in FIG. 2 having an aspect ratio $w_1/h_1$ of about 5/3. The central region 20 has the width of the conventional 4/3 aspect ratio image and is represented by signal 14. The side panels 21 and 22 are represented by signal 13 which is stored in 15. Field store 17 is used to assemble the components of an image having a 4/3 aspect ratio compatible with existing NTSC receivers.

This image is illustrated on the right side of FIG. 2. Here the ratio $w_2/h_2$ is approximately 4/3. However, the NTSC receiver sees only the central image 20. The information above and below the central image 20, 24 and 25, are used to store the side panel information for 21 and 22, the side panel information for the increased aspect ratio receiver. Ideally the regions 24 and 25 will be of low visibility on existing NTSC receivers.

The field store includes the 262½ lines for a normal NTSC receiver. About 26 scan lines that are normally used as active picture lines are used to store the side panel information and be of low visibility on NTSC receivers. Each of these lines contains about 10 pairs of 2.7 μsec video signals representing the side panels for about ten lines. Thus the 26 inactive scan lines contain the side panel information for an entire field. These 26 inactive lines are added to the usual inactive lines used for synchronization and blanking. Field store 17, having a distribution of information as shown on the right side of FIG. 2 is scanned to provide signal 33 and used to modulate the transmitted signal.

When signal 33 is received by conventional NTSC receivers they receive image region 20. However, the inactive lines in regions 24 and 25 will result in incoherent video information which may prove distracting. It would be desirable if regions 24 and 25 were of low visibility. One way of achieving this is illustrated in FIG. 1a. Here the high energy low-frequency information is attenuated to reduce the dynamic range of the signal 19, representing the side panel information in the inactive lines in 24 and 25. If these are significantly attenuated, the resulting signal is placed at a d.c. level at or near the black level, to minimize the visibility. Since most of the signal energy is approximately in the first 300 KHz, low frequency de-emphasis filter 26 reduces this region a factor of between 2-10. The smaller reduction factor can cause inadequate suppression, with excessive visibility of signals in the inactive line region. The larger number causes almost complete "blackness" of the coded inactive lines, but can cause excessive reduction of the signal-to-noise ratio of the low frequency signals, when restored at the receiver. Indeed, the entire signal 19 can be attenuated to reduce its visibility at the price of reduced signal-to-noise ratio.

To avoid the loss of signal-to-noise ratio of the low frequency information in the side panels, the low frequencies can be separately encoded as shown in FIG. 3. Here the side-panel reformatting system, 16, first separates the side panel information into low and high frequencies using filters 61 and 60. The high frequency information, 65 is stored in 62 and then applied to field store 17 as part of signal 19. This high-frequency signal is again added to a d.c. voltage at or near black level and placed in the inactive lines 24 and 25. The low-frequency information is compressed in 63 and added to the signal in the compressed form. One method of adding the compressed low-frequency side panel information is that suggested in the previously referred to paper by M. A. Isnardi et al. where the compressed lows are included in two narrow strips on either side of the transmitted image. These are illustrated as 50 in FIG. 8a. If low pass filter 61 includes approximately 300 KHz, then about 10/1 compression can be used, so that these side strips will be about 0.3 μsec in length. These will be invisible on essentially all existing receivers because of normal overscan. The 10/1 compression will increase the bandwidth of these short strip regions to about 3 MHz, well within the system bandwidth.

If it is desired not to use any of the active part of a scan line, the low frequency side panel information can also be put in the inactive line region, in the form of a modulated burst, to insure low visibility. As shown in FIG. 4, the compressed low frequency signal 64 is used to modulate a high frequency burst in 70 and then, as part of signal 19, added to the inactive lines in field store 17. The modulated burst, of about 0.5–1.0 μsec in duration, can be placed at the beginning of each corresponding high frequency side panel segment as shown in FIG. 9a.

These signals when added to the black level in the inactive lines should be of relatively low visibility with the one exception of the color subcarrier, which, for saturated colors, can have an appreciable amplitude. This can be dealt with by de-emphasizing the signals in the region of the color subcarrier as shown in FIG. 5. Filter 66 attenuates signal 65 in the vicinity of the color subcarrier. Again, the attenuation can be from 2-10, with the same tradeoff of visibility and signal-to-noise-ratio. The signal is then stored in 62.

What has been described is a system whereby information can be added to a television signal so as to increase the aspect ratio of HDTV receivers, and be compatible with existing NTSC receivers. These receivers will see an image with narrow darkened strips on the top and bottom, and only is about 10% of the height. Also, the increased aspect ratio information does not use up any of the encoded bandwidth, which is so important to use for increased resolution.

The increased aspect ratio receiver for utilizing these signals is shown in FIG. 6. Signal 33, the basic scanned signal, is derived in conventional fashion from receiver 30. The active lines from the signal are passed on to frame store 34. Gate 31 is used to separate the inactive line groups, 24 and 25, from the top and bottom of the image and store this information in 32. These are used to provide the increased width side panel information. The stored data is applied to the appropriate side panel locations in 34, forming side panels 21 and 22 in the final image. Frame store 34 is read out to form signal 35 which is applied to the higher aspect ratio display.

FIG. 6 is modified if the various methods for reducing the visibility of the inactive lines are used. In FIG. 6a, low-frequency enhancement is used, to compensate for low frequency reduction, if employed, in the signal formation. Side-panel signal 36 goes through low-frequency booster 44 before being stored in 34.

Alternatively, if the low and high frequencies of the side panels have been separated, the receiver block diagram is modified as in FIG. 7. Here the high frequencies are treated as before, where they are gated out in 31, stored in 32, and applied to the side panels in 34. The compressed low frequencies are extracted in 40, expanded to their normal time sequence in 41, and applied to the side panels in frame store 34.

If the compressed low frequencies have been applied to the edges of the image, as shown in FIG. 8a, they can be extracted as shown in FIG. 8. Here extractor 40 includes horizontal edge gating 45, which extracts the compressed lows from the two edges of the image and stores them in store 46 before they are sent, as signal 42, to expander 41. Alternatively, if the compressed low frequencies are stored as modulation of burst 55 in FIG. 9a, and placed alongside the high frequency information 56 in the inactive lines, they can be decoded as shown in FIG. 9. Here the composite signal 33 is gated by gate 58, which is timed with the sequence of bursts occurring within each inactive line, for each line of the side panel. Since these gates are synchronous with the horizontal sync, their timing can be derived from the horizontal sync, or derived from the burst itself. The separated bursts are applied to detector 59, such as an envelope or synchronous detector, to demodulate the compressed low frequencies. These are stored in 46 before being passed on, as signal 46, to the expander 41.

If the color subcarrier has been reduced, as in FIG. 5, to reduce the visibility of high-saturation color signals, it is restored as shown in FIG. 10. Here enhancer 80 is used to peak up the response in the vicinity of the color subcarrier by the same amount that it had been reduced in FIG. 5. The restored color signal then goes to frame store 34 which is scanned to form the increased aspect ratio signal.

To further insure that the signals in the inactive lines do not disturb conventional television receivers a black border can be placed around the image by having a few lines, on the top and bottom of the image, be at black level without adding any coded information. Thus 2-10 of the inactive lines are used solely for this black border, with the remainder containing the side panel information.

The numbers used are given as examples, and wide variations can be used. In the example given, approximately 10% of the vertical lines are rendered inactive and the added information is used for about a 10% increase in width using side panels to provide about a 5/3 aspect ratio. These numbers can be changed significantly, as can the desired aspect ratio, within the confines of this invention.

This invention can be used to provide a system of increased aspect ratio which is compatible with existing receivers. As compared to alternative methods, it does not use up any additional bandwidth during the normal image scan time, and thus leaves this available for enhanced resolution. It is also more stable in that the added information will receive substantially the same variations as the normal signal, so that the side panels will have the same intensity and color as the rest of the scan line. This invention can be used with HDTV systems providing improved resolution, either through additional bandwidth or through the use of encoded carriers within the same bandwidth. The latter is facilitated by the unique approach of using the inactive lines for the side panel information.

What is claimed is:

1. In a method for providing an increased aspect ratio television image using a modified signal which is compatible with standard television receivers receiving standard television signals where the increased width of the increased aspect ratio image is obtained by adding side panels on each side of a standard television image comprising the steps of:

reducing the number of active scanning lines in the standard television signal by inactivating lines which are within the viewing area of the standard television receiver; and inserting information in the inactive scanning lines representing solely information from the side panels in a manner which substantially minimizes the visibility of these lines when viewed on a standard television receiver.

2. The method as described in claim 1 including the step of high-pass filtering the information representing the side panels of the increased aspect ratio television signal and adding the high-passed filtered information to a region of the inactive scanning lines representing black, whereby the added information will be substantially invisible.

3. The method as defined in claim 2 including the step of de-emphasizing the amplitude of the high-frequency side panel signal in the vicinity of the color subcarrier whereby the maximum amplitude of the high-frequency signal is reduced.

4. The method as described in claim 2 including the steps of low-pass filtering the information representing the side panels of the increased aspect ratio image; time-compressing the low-pass filtered information and adding it to both ends of the active scanning lines of the modified signal.

5. The method as described in claim 2 including the steps of low-pass filtering the information representing the side panels of the increased aspect ratio image; time-compressing the low-pass filtered information; modulating a carrier with the time-compressed information and adding the modulated carrier to the signal in the inactive scan lines.

6. The method as described in claim 1 including the step of attenuating low frequencies from the side panel information inserted in the inactive scanning lines whereby the dynamic range of the inserted information is reduced.

7. Apparatus for receiving a modified signal for creating an increased aspect ratio television image where the increased width of the increased aspect ratio image is created by adding side panels on either side of a standard television image and where inactive scan lines which are within the visible region of the standard television image contain solely the side panel information and where the information in these inactive scan lines is substantially invisible in the standard television image comprising:

means for extracting the side panel information from the inactive scan lines;
means for storing the side panel information; and
means for adding the stored side panel information to the corresponding active scan lines of the increased aspect ratio television image.

8. Apparatus as defined in claim 7 where the information added to the inactive scan lines is high-frequency information and the amplitude of the high-frequency information has been reduced in the vicinity of the color subcarrier further comprising means for boosting the high-frequency information in the vicinity of the color subcarrier to compensate for the reduction at the transmitter.

9. Apparatus as defined in claim 7 where the side panel information in the modified signal is separated into low-frequency information and high frequency information and where the low-frequency information is compressed and added to the ends of the active lines and the high-frequency information is inserted into the inactive lines further comprising:

means for extracting and time-expanding the low-frequency side panel information; and
means for adding the time-expanded low-frequency information to the stored high-frequency information derived from the inactive scan lines.

10. Apparatus as defined in claim 7 where the side panel information in the modified signal is separated into low-frequency information and high-frequency information and where the low-frequency information is compressed and used to modulate a carrier burst and added to the high-frequency side panel information in the inactive lines further comprising:

means for demodulating the carrier burst to derive the time-compressed low-frequency side panel signals;
means for time-expanding the low-frequency side panel signals; and
means for adding the low-frequency side panel signals to the stored high-frequency side panel signals derived from the inactive scan lines.

11. Apparatus as described in claim 7 where low-frequency side panel information in the modified signal has been reduced including means for enhancing the low-frequency information to compensate for the reduction at the transmitter.

* * * * *